United States Patent [19]

Schouwenaars

[11] 4,082,293
[45] Apr. 4, 1978

[54] PHONOGRAPH RECORD PLAYER OR CHANGER

[75] Inventor: Jozef E. K. M. Schouwenaars, Eindhoven, Netherlands

[73] Assignee: U.S. Philips Corporation, New York, N.Y.

[21] Appl. No.: 715,139

[22] Filed: Aug. 17, 1976

[30] Foreign Application Priority Data

Aug. 29, 1975 Netherlands .......................... 7510210

[51] Int. Cl.² ............................................. G11B 3/60
[52] U.S. Cl. .................................................. 274/39 A
[58] Field of Search .................. 274/39 R, 39 A, 1 A; 308/135, 140, 139, 141

[56] References Cited

U.S. PATENT DOCUMENTS

| 3,025,066 | 3/1962 | Siebert | 274/39 R |
| 3,341,968 | 9/1967 | Suchowski | 274/1 A X |
| 3,738,195 | 6/1973 | Stern et al. | 274/1 A X |
| 3,784,853 | 1/1974 | Wangsness | 274/39 R X |

FOREIGN PATENT DOCUMENTS

| 917,216 | 8/1954 | Germany | 308/139 |
| 66,751 | 11/1950 | Netherlands | 274/39 R |

*Primary Examiner*—Charles E. Phillips
*Attorney, Agent, or Firm*—Frank R. Trifari; David R. Treacy

[57] ABSTRACT

A phonograph record player or changer having a turntable spindle whose lower end is journalled in a combined thrust and radial bearing, while the upper end of the spindle is located by two contact regions on a sleeve bearing. The upper sleeve bearing is formed with two portions extending toward the center of the bearing bore arranged so that a resultant of all of the transverse forces on the spindle passes between the two contact regions, thereby producing a phonograph with reduced wow and flutter.

2 Claims, 11 Drawing Figures

PHONOGRAPH RECORD PLAYER OR CHANGER

BACKGROUND OF THE INVENTION

1. Field of the Invention

This invention relates to a phonograph record player or changer, and more particularly to a combination of turntable drive and bearing arrangement.

Phonograph turntables referred to below are suitable for record players, whether manual or automatic, and automatic changers; as used herein, "record player" should be understood to include record changers.

When using highly sensitive stereophonic pick-up elements in phonographs, each movement of a record turntable, either in a plane parallel to the record or perpendicular thereto, will produce a signal in one or two channels of the stereophonic audio system. In a high fidelity phonograph the turntable is required to be capable of rotating a phonograph record about the record's central axis with an accurately defined speed, in such a way that substantially no variations occur in angular velocity, and no movements are introduced perpendicular to the plane of the record. It therefore follows that the turntable itself should rotate uniformly about its own central axis and thus provide uniform movement of each point of the turntable at which any contribution might be made to the production of undesired signals in the pick-up element.

Bearing arrangements for turntables must clearly fulfill two functions. First, a turntable mounted with its rotational axis vertical requires a thrust bearing function to support the weight of the turntable, any records on it, and any other downward forces due to mechanisms or vertical force exerted by a pick-up or other sensor. Secondly, radial bearing functions must position the turntable in the horizontal plane and maintain the verticality of the turntable axis. To maintain verticality it is then necessary to have effectively two radial bearings or portions thereof separated by an axial distance, such bearings being commonly referred to as the upper bearing and the lower bearing.

The basic type of radial lower bearing is a cylindrical bearing. However, such bearings normally exhibit play, and because of the slight eccentricity of the pivot relative to the central line of the spindle, which always exists in practice, the cylindrical pivot journal thus causes the spindle to move transversely relative to the bore of the bearing, within the limitations of the play. This gives rise to varying moments of friction at the circumference of the spindle, and therefore may cause load variations which in turn cause speed variations of the turntable. Such variations contribute to an undesired noise in the audio system, generally denoted as "wow and flutter," and which may be expressed numerically as a wow and flutter value.

Similarly, the use of a simple cylindrical upper bearing for the upper radial bearing can cause transverse movements of the turntable and variations of the angular velocity of the spindle relative to the bearing. The spindle will not constantly contact the upper bearing at the same location, but at a location that depends on the co-efficient of friction and the prevailing transverse force. For each revolution of the spindle instantaneous variations of the co-efficient of friction occur because the spindle does not have the same friction properties over its entire surface. Further, variations in the transverse forces which act locally on the spindle are caused by variations in the friction between the pick-up element and the record, by a record surface cleaner if one is used, and by any variations in the transverse force which may be exerted by the turntable drive. As with the lower bearing, these effects also contribute to wow and flutter.

2. Description of the Prior Art

U.S. Pat. No. 3,082,635 describes a record player having an improved turntable bearing arrangement which reduces undesired vibration of the turntable and resulting noise in the ultimately re-produced sound. In this known record player a lower combination thrust and radial bearing is used, plus a sleeve bearing nearer the turntable. The lower bearing comprises a bearing element having a conical cavity, engaged by a ball-shaped end of the turntable spindle. This engagement provides a substantially circular contact surface between the bearing element and the spindle end. In comparison with arrangements having a plain radial lower bearing such as a cylindrical sleeve bearing, this known player provides a reduction of the periodically changing frictional forces which would otherwise act at the circumference of the spindle.

The upper bearing is a sleeve bearing near the underside of the turntable, having an angular bearing element made of polytetrafluoroethylene plastic, which cooperates without play with a locally cylindrical portion of the spindle. Freedom from play is obtained by slight deformation of the plastic bearing element. However, such deformation increases the friction torque, while in the event of wear of the bearing surfaces play may still arise between the spindle and the bearing.

SUMMARY OF THE INVENTION

An object of the invention is to provide a record player having a turntable drive and bearing arrangement which, without introducing excessive friction, precludes displacement of the point of contact between the spindle and the bearing.

A further object of the invention is to provide a drive and bearing arrangement for a record player which is simple and rugged, relatively inexpensive to manufacture, and provides notably low wow and flutter.

According to the invention, the upper bearing for a turntable spindle engages a cylindrical portion of the spindle at only two contact regions, which are angularly separated about the circumference of the bearing bore, the two contact regions being so arranged with respect to the drive means and other elements of the record player such that a resultant force of all the transverse forces acting on the spindle has a radial angular direction falling between the two contact regions.

In a preferred embodiment, the upper bearing is a sleeve bearing having radial play around a circular cylindrical portion of the spindle, the sleeve bearing having two contact regions extending inwardly toward the center of the bore from an otherwise generally circular cylindrical bore. This embodiment has the particular advantage that during extreme conditions, such as when the record player is being moved, the spindle always remains substantially in its operating location.

BRIEF DESCRIPTION OF THE DRAWING

The invention is further exemplified by two embodiments shown in the drawing, in which.

DESCRIPTION OF THE PREFERRED EMBODIMENTS

Figure 1:
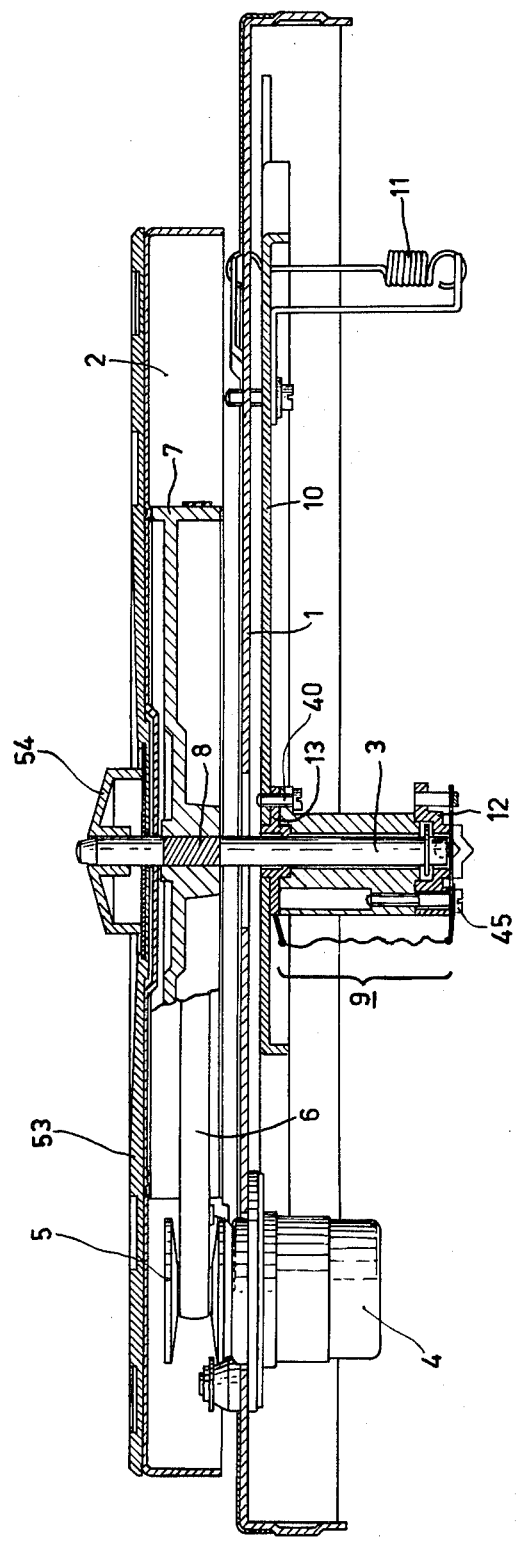
FIG. 1 is an elevation in cross-section through the spindle of a record player turntable drive and bearing mechanism according to the invention.

In FIG. 1 a record player turntable with its mechanical drive and bearing arrangement are shown, without the pick-up arm, changer mechanism or other ancillary equipment which do not form part of the invention. As shown in FIG. 1, a frame 1 supports a turntable 2 which is mounted on a spindle 3 that is rotatably journalled in the bearing arrangement to be described. An electric motor 4 is mounted on the frame 1, and has a driving pulley 5 over which a drive belt 6 passes. The drive belt 6 in turn engages a plastic pulley 7 which is fixed to the turntable spindle by being pressed onto a grooved portion 8 of the spindle 3. The spindle 3 is supported and guided in the bearing arrangement 9, which in turn is mounted to a sub-frame 10 resiliently suspended from the frame 1 by a plurality of springs 11, one of these springs being shown in FIG. 1.

Figure 2:
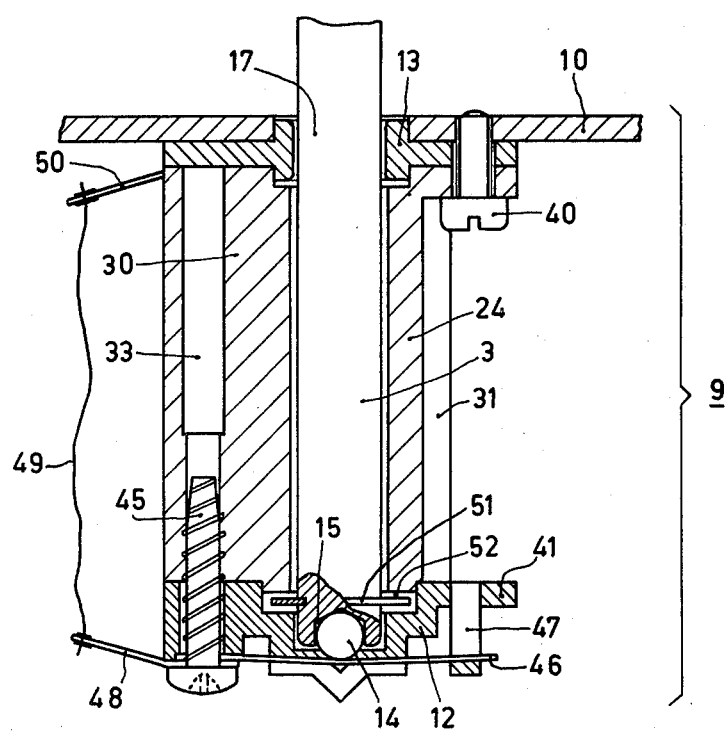
FIG. 2 is an enlarged cross-section of the bearing arrangement shown in FIG. 1.

As shown in greater detail in FIG. 2, the bearing arrangement 9 includes a lower bearing 12 in which the lower end of the spindle rides, and an upper bearing 13 formed as a sleeve bearing and engaging the spindle between the lower end and the turntable 2. To provide long life and smooth operation, a hardened steel ball 14, having a radius preferably of approximately 2 mm, is held by a light interference fit in a longitudinal bore 15 located centrally at the lower end of the spindle 3. As described below this ball acts as a pivot engaging the lower bearing 12 so as to provide both thrust and radial bearing functions.

Figure 5:
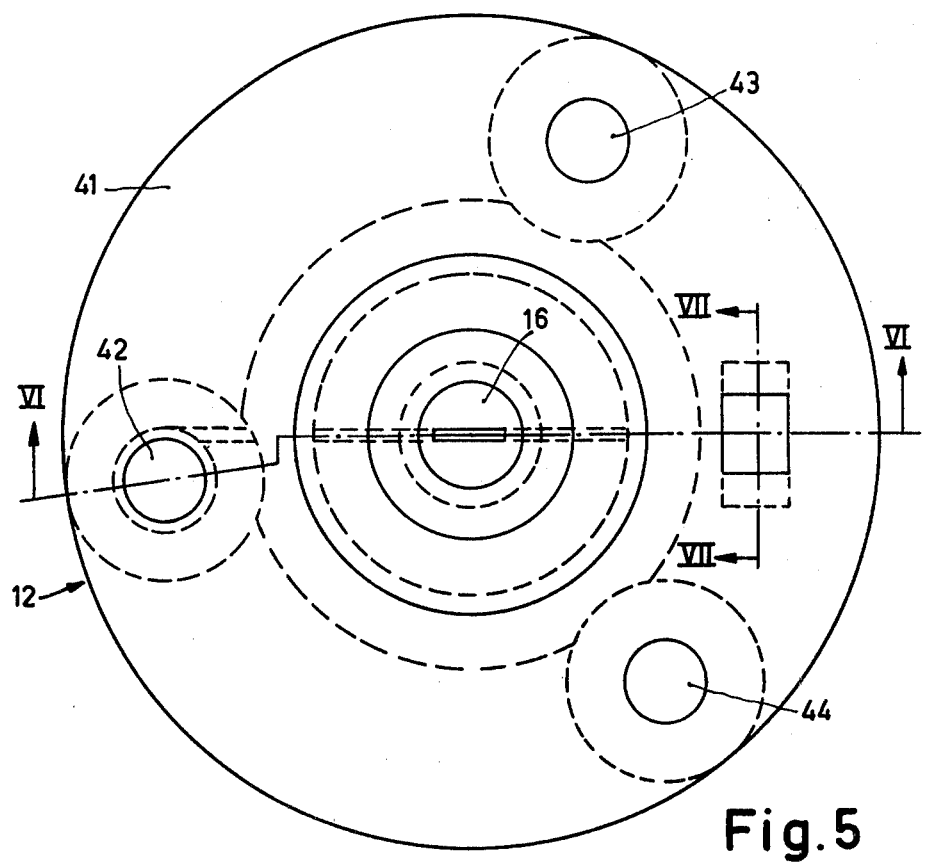
FIG. 5 is an enlarged plan view of the lower bearing shown in FIG. 1.
Figure 6:
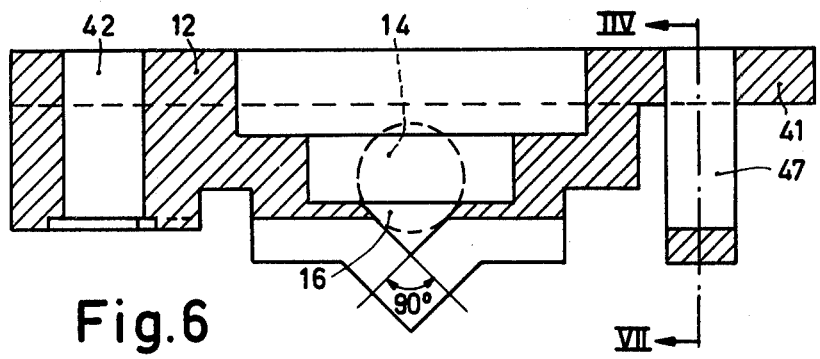
FIG. 6 is a cross-section through the bearing axis of the bearing shown in FIG. 5.
Figure 7:
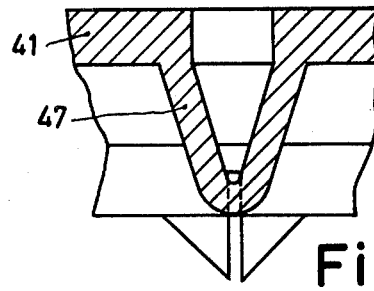
FIG. 7 is another cross-section of the lower bearing shown in FIG. 5.

Details of the preferred configuration of the lower bearing 12, which is preferably made of a nylon bearing material, are shown in FIGS. 5–7. A cavity 16 formed as a truncated cone having an apex angle of 90° is centrally located, and engaged by the ball 14 along a circular contact surface. This form of radial/axial bearing having a hardened steel surface riding on nylon provides both a low co-efficient of friction, and inherent integration over the circumference of the contact surface of the variations in friction which occur locally, so that deviations from the average friction during rotation of the spindle about the center of the circular contact surface are small.

Figure 8:
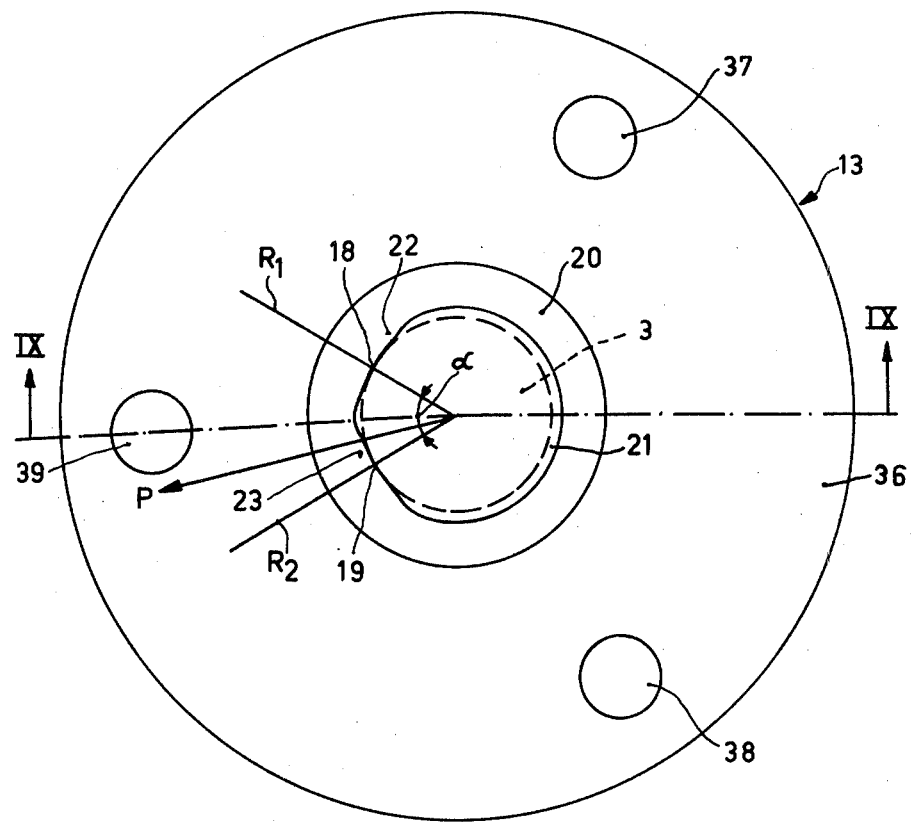
FIG. 8 is an enlarged plan view of the upper bearing used in the embodiment of FIG. 1.
Figure 9:
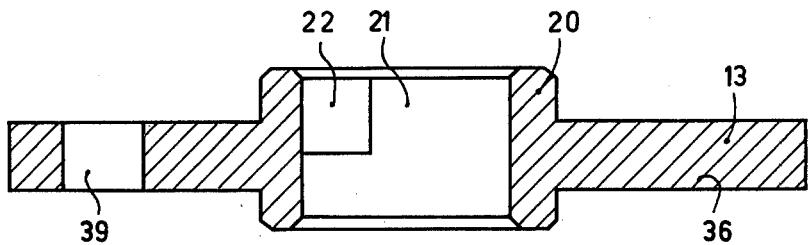
FIG. 9 is a cross-section through the bearing axis of the bearing shown in FIG. 8.

The upper bearing, which in a first embodiment is shown generally in FIG. 2 and in greater detail in FIGS. 8 and 9, is a sleeve bearing formed preferably of a nylon or sintered bronze material which engages the spindle 3 along a circular cylindrical portion 17 of the spindle. The sleeve bearing 13 has two contact regions 18 and 19 which extend inwardly from a wall 20 of the bearing whose inner surface forms a bearing bore 21. The contact regions 18 and 19 are located at positions around the circumference of the bore separated by a given angle $\alpha$, transverse to radii $R_1$ and $R_2$. The bearing and these radii are arranged with respect to the drive pulley 5 such that a resultant P of all of the transverse forces which act locally on the spindle will extend radially between the radii $R_1$ and $R_2$. By this construction contact of the spindle 3 with both of the contact regions 18 and 19 is assured under all operating conditions, and thus an accurately defined position of the turntable spindle 3 is obtained, which position will not change during operation.

The upper bearing 13 has a generally annular configuration, surrounding the spindle 3 approximately concentrically. Except for contact at the regions 18 and 19, the bore 21 is sized to exhibit radial play around the circumference of the bore 21 except for the portions 22 and 23 which extend inwardly toward the center of the bore, the contact regions 18 and 19 being on those portions.

Figure 3:
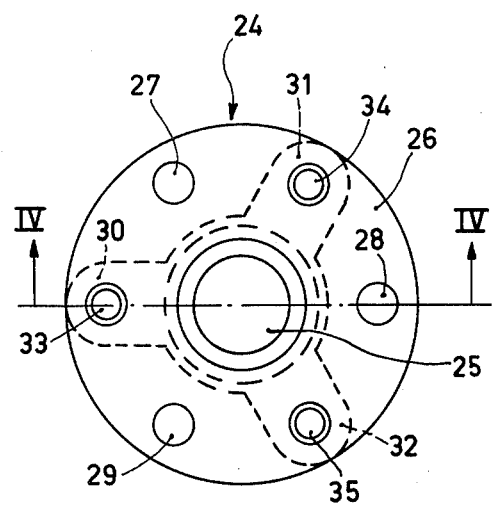
FIG. 3 is a plan view of the bearing support and spacer shown in FIG. 2.
Figure 4:
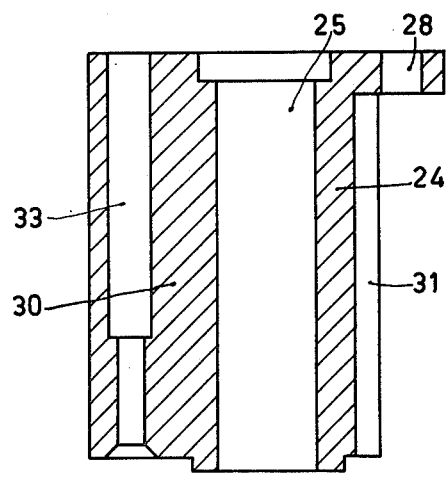
FIG. 4 is a sectional view through the longitudinal axis of the spacer of FIG. 3.

In the preferred embodiment shown in FIG. 1, the lower bearing 12 is not supported directly from the sub-frame 10. Rather, a spacer 24 made of plastic material, as shown most clearly in FIGS. 3 and 4, is fastened and located by the underside of the upper bearing 13, and provides mounting support for the lower bearing 12. The spacer 24 is made preferably of a plastic material, and has a bore 25 through which the spindle 3 passes. At the upper end, the spacer 24 has a flange 26 in which three mounting holes 27, 28, and 29 are formed. Below the flange 26 the spacer also has three radially extending longitudinal ridges 30, 31 and 32 which provide reinforcement strength. Longitudinally extending bores 33, 34 and 35 are formed in each of the ridges respectively, for use in mounting the lower bearing as described below. Corresponding to the flange 26, the upper bearing 13 has a flange 36 having mounting holes 37, 38 and 39 aligned with the holes 27–29, so that the upper bearing 13 may be held securely between the flange 26 and the sub-frame 10 by screws 40 passing through the respective mounting holes and engaging tapped holes in the sub-frame 10.

Similarly, as best shown in FIG. 5, the lower bearing 12 is also connected to the spacer 24 by a flange 41 formed integrally with the bearing 12 and having three mounting holes 42, 43 and 44 therethrough, aligned with the bores 33, 34 and 35 in the spacer 24. Self tapping screws 45 passing through the mounting holes 42–44 engage the bores 33–35 to hold the lower bearing firmly in place.

If both the lower bearing 12 and the upper bearing 13 are made of plastic materials, these bearings will not provide the function of draining static electricity from the turntable 2 via the spindle 3 to the sub-frame 10 and frame 1. To prevent the occurrence of noises associated with the erratic discharge of static electricity, a means for grounding static charges to the frame is shown most clearly in FIG. 2. A metal wire spring 46 is clamped underneath the head of one of the screws 45, and passes across through a groove in the bearing 41, under and in contact with the ball 14, and an end of the spring 46 extends under a V-shaped bracket 47 formed integrally with the flange 41 of the lower bearing 12. A terminal lug 48 is also held under the head of the same screw 45, firmly in electrical contact with an end of the spring 46, a conducting wire 49 being connected to the lug 48 and also connected to a second terminal lug 50 which is fastened to the sub-frame in a conventional manner, not shown.

To prevent possible undesired axial movement of the turntable spindle 3 during shipment, a retaining ring 51 is fitted on the spindle 3 near the ball 14, the ring being free to rotate in a space 52 between the lower bearing 12 and the spacer 24 during normal operation.

To provide protection to records during use, and convenience of operation, a rubber mat 53 is preferably placed on the turntable 2, which may be made of sheet steel, as shown in FIG. 1, and a cap 54 is provided which may be mounted on the upper end of the turntable spindle 3 so as to adapt the turntable center to the size of central hole of a 45 rpm record.

Figure 10:
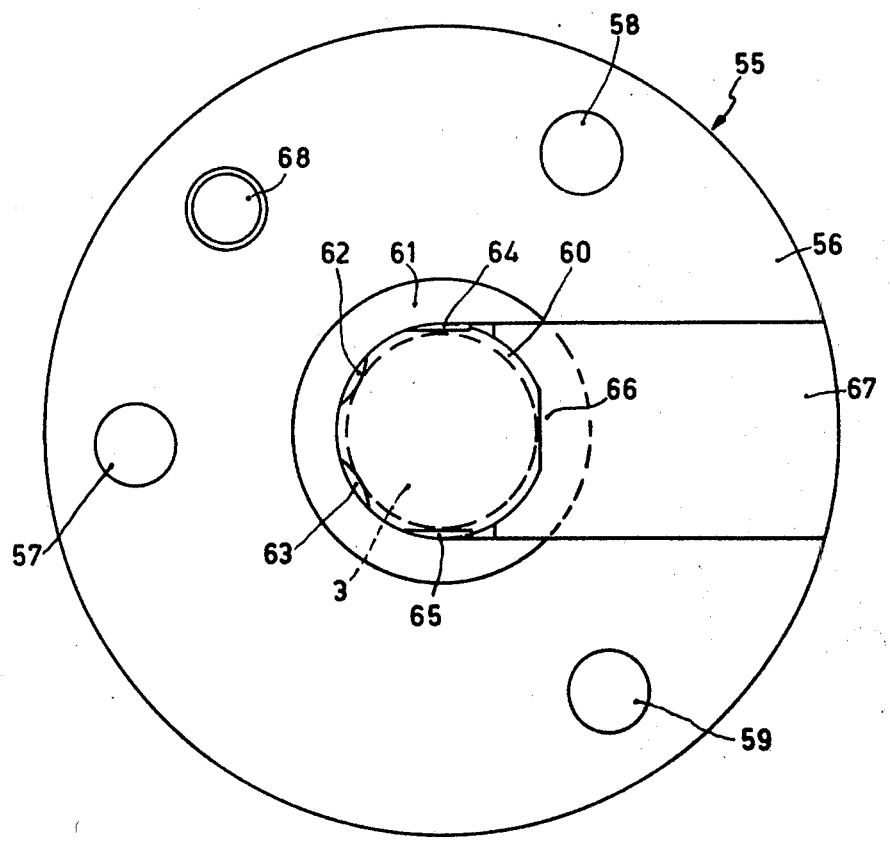
FIG. 10 is an enlarged plan view of another upper bearing embodiment usable in the record player in accordance with FIG. 1.
Figure 11:
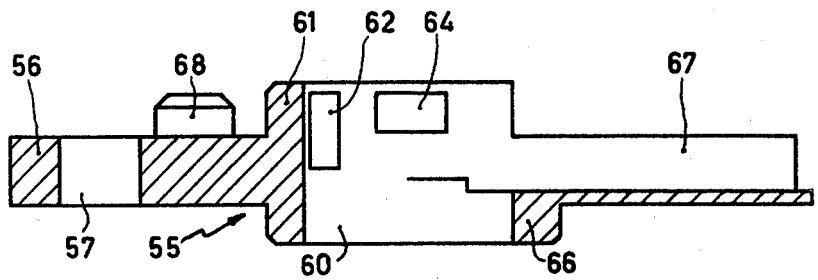
FIG. 11 is an enlarged cross-section through the bearing axis of the bearing of FIG. 10.

An alternative embodiment of the invention is shown in FIGS. 10 and 11, in which an upper bearing 55, which may be made of any common plastic, preferably nylon, has a mounting flange 56 through which mounting holes 57–59 are provided, aligned with the corresponding holes of the spacer. A bearing bore 60 through the upper bearing 55 has a wall 61 with two projecting portions 62 and 63 which extend from the wall toward the center of the bore, these portions having the same function as the portions 22 and 23 of the bearing 13 described above. Three additional portions 64, 65 and 66, which also extend toward the center of the bore 60, determine the play of the spindle 3 with respect to the wall of the bore 60. To simplify production, the flange 56 has a groove 67 so that support may be provided to a die portion which establishes the location of the portions 62–65 during injection molding. It is also preferred that during this process a centering pin 68 is formed on the flange 56 so as to facilitate mounting and centering of the flange on the sub-chassis 10.

It will of course be clear that other bearing materials may be used in place of those suggested in the preferred embodiments, and that other embodiments according to the invention will be readily devised by those skilled in the art; for example, other mounting means can be used to hold the bearings with respect to the frame, rather than the plastic spacer 24.

I claim:

1. A turntable drive and bearing mechanism for a phonograph record player having low wow and flutter, comprising a frame; a lower, thrust bearing mounted to the frame, and an upper sleeve bearing remote from said lower bearing and mounted to the frame; a turntable spindle having a longitudinal axis, a coaxial circular cylinder portion engaging said upper sleeve bearing, and a lower end engaging said thrust bearing; a turntable mounted on said spindle for rotation therewith about said axis, said upper bearing being between said thrust bearing and said turntable; and drive means for rotating said turntable about said axis;

wherein said drive means exerts a transverse force on the spindle; and said upper sleeve bearing has two contact regions, and surrounds said circular cylindrical portion with radial play such that bearing contact engagement with said cylindrical portion occurs at said two contact regions only, said upper bearing having a generally circular cylindrical bore, with said contact regions lying in a plane transverse to the spindle axis and extending inwardly toward the center of the bore at angularly separated locations about said spindle and so arranged that a resultant force of all transverse forces acting on the spindle has a radial angular direction between said two locations.

2. A mechanism as claimed in claim 1, wherein said bearings are made of a plastic material, and said mechanism comprises means contacting said lower end for electrically grounding the spindle to the frame.

* * * * *